(12) United States Patent
Yamaura

(10) Patent No.: US 6,726,963 B2
(45) Date of Patent: Apr. 27, 2004

(54) METHOD OF PREPARATION OF FUEL CELL

(75) Inventor: Kiyoshi Yamaura, Kanagawa (JP)

(73) Assignee: Sony Corporation, Tokyo (JP)

( * ) Notice: Subject to any disclaimer, the term of this patent is extended or adjusted under 35 U.S.C. 154(b) by 95 days.

(21) Appl. No.: 09/967,523

(22) Filed: Sep. 28, 2001

(65) Prior Publication Data

US 2002/0072470 A1 Jun. 13, 2002

(30) Foreign Application Priority Data

Sep. 29, 2000 (JP) .................................... P2000-301410

(51) Int. Cl.[7] .............................. H05H 1/32; C08J 7/18; B05D 5/12
(52) U.S. Cl. ..................... 427/540; 427/532; 427/115; 427/580; 427/535; 427/562; 427/249.1; 205/57
(58) Field of Search ................................. 427/532, 535, 427/540

(56) References Cited

U.S. PATENT DOCUMENTS

| | | | | |
|---|---|---|---|---|
| 5,470,680 A | * | 11/1995 | Loutfy et al. ............. | 429/218.2 |
| 6,105,417 A | * | 8/2000 | Nosaka ...................... | 73/31.05 |
| 6,469,425 B1 | * | 10/2002 | Sakai et al. .................. | 313/310 |
| 6,495,290 B1 | * | 12/2002 | Hinokuma et al. ...... | 429/231.8 |
| 2002/0006539 A1 | | 1/2002 | Kubota et al. | |

FOREIGN PATENT DOCUMENTS

| | | |
|---|---|---|
| JP | 03167712 | 7/1991 |
| JP | 40172 | * 2/1999 |
| JP | 263609 | * 9/1999 |
| JP | 11263609 | 9/1999 |
| JP | 2000003714 | 1/2000 |
| JP | 2001-307751 | 11/2001 |

OTHER PUBLICATIONS

Che, Guangli; Lakshmi Brinda B.; Fisher, Ellen R.; Martin, Charles R.; *Carbon nanotubule membranes for electrochemical energy storage and production*, Nature; May 28, 1998, pp. 346–349.

* cited by examiner

*Primary Examiner*—Brian K. Talbot
(74) *Attorney, Agent, or Firm*—Bell, Boyd & Lloyd LLC

(57) ABSTRACT

A fuel cell and methods of producing same are provided. The fuel cell includes a fuel electrode, an oxygen electrode and a proton conductor material disposed there between. The fuel cell can be produced by producing an arc discharge across a pair of electrodes composed of carbon to form a carbonaceous material which can be deposited onto a proton conductor material to form at least one of the fuel and oxygen electrode thereon.

4 Claims, 7 Drawing Sheets

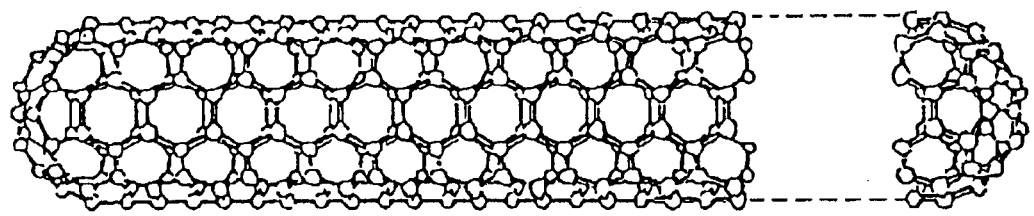
FIG.7A
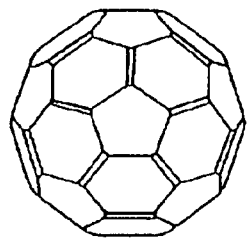 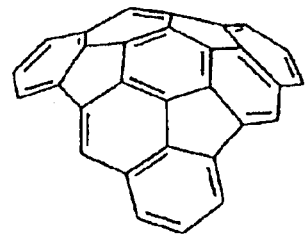
FIG.7B   FIG.7C

METHOD OF PREPARATION OF FUEL CELL

RELATED APPLICATION DATA

The present invention claims priority to Japanese Patent Application No. P2000-301410 filed on Sep. 29, 2000. The above-referenced Japanese Patent Document is hereby incorporated by reference to the extent permitted by law.

BACKGROUND OF THE INVENTION

The present invention relates to a method for the preparation of a fuel cell. More particularly, it relates to a method for the preparation of a fuel cell employing a carbonaceous material for a fuel electrode and/or an oxygen electrode.

As the world's supply of fossil fuels is limited, there has been ongoing research directed toward alternative energy sources, including those that may be more environmentally friendly than traditional fossil fuels. A hydrogen gas fuel is one such example. Since hydrogen contains relatively large amounts of energy per unit weight and because it does not emit noxious gases or gases contributing to global warming, hydrogen may be an ideal energy source that is clean and moreover plentiful in supply.

Fuel cell technology involves the recovery of electrical energy from hydrogen. Fuel cell research is proceeding rapidly, with a variety of promising applications, such as large scale power generation, on-site self-generation of power, or as a power source for electric vehicles.

The fuel cell includes a fuel electrode, such as a hydrogen electrode, and an oxygen electrode, arranged on both sides of a proton conductor film. Supplying fuel (hydrogen) and oxygen to these electrodes induces a cell reaction that develops an electromotive force. In preparing the fuel cell, the proton conductor film, the fuel electrode and the oxygen electrode are routinely molded separately and bonded together.

However, in forming the fuel electrode and the oxygen electrode separately, a variety of inconveniences arise due to difficulties encountered in handling. For example, if the strength of the fuel electrode or the oxygen electrode is considered, a certain thickness is needed (e.g., a thickness on the order of 100 $\mu$m or more). However, if the electrode thickness is increased, the efficiency of the cell reaction is lowered, thus lowering cell performance. If, in order to avoid this, the electrode thickness is decreased, the electrolyte film (or like film) cannot be handled as an independent film, thus significantly lowering production yield.

The production process associated with molding an electrode material and bonding it to a proton conductor is extremely cumbersome and inefficient in view of productivity.

SUMMARY OF THE INVENTION

The present invention provides a method for the preparation of a fuel cell that is capable of producing superior cell performance. The present inventors have found that, by placing a proton conductor in an arc discharge space, an electrode composed of a carbonaceous material can directly be formed on the proton conductor.

In an embodiment, the present invention relates to a method for the preparation of a fuel cell producing arc discharge across carbonaceous electrodes to deposit the generated carbonaceous material directly on the proton conductor for use as a fuel electrode and/or as an oxygen electrode.

In an embodiment, because carbonaceous material generated by arc discharge is directly deposited on the proton conductor as a support to form the electrodes, it is unnecessary to handle the fuel and oxygen electrodes separately, and thus it is unnecessary to consider mechanical strength. Accordingly, these electrodes can be reduced in thickness, thus the cell reaction proceeds smoothly to improve cell performance.

The operation of separately preparing the fuel or oxygen electrodes and bonding the electrodes to the proton conductor is unnecessary to improve the productivity appreciably. In an embodiment of the present invention, since there is no necessity for separately handling the fuel or oxygen electrodes, complex operations are unnecessary and the production yield can be improved appreciably. Additionally, since the mechanical strength of the fuel or oxygen electrodes is if minimal importance, electrodes having superior cell characteristics such as energy density can be produced.

Additional features and advantages of the present invention are described in, and will be apparent from, the following Detailed Description of the Invention and the figures.

BRIEF DESCRIPTION OF THE FIGURES

FIGS. 7A to 7C schematically show various carbonaceous materials contained in a carbon soot manufactured by arc discharge according to an embodiment of the present invention.

DETAILED DESCRIPTION OF THE INVENTION

The method for the preparation of a fuel cell according to the present invention is explained in detail.

Figure 1:
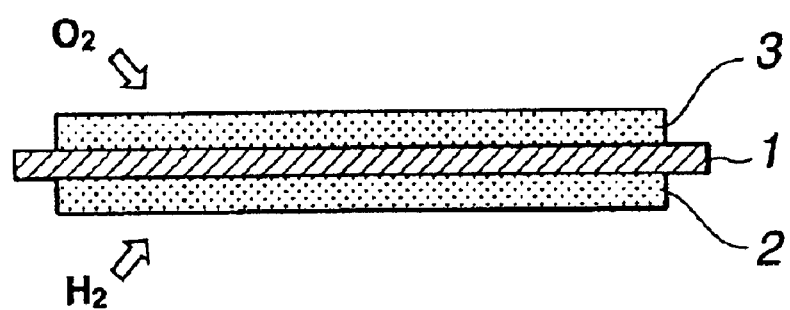
FIG. 1 is a schematic cross-sectional view showing a fuel cell according to an embodiment of the present invention.

The fuel cell shown in FIG. 1 is essentially composed of a proton conductor material 1 (i.e., electrode film, electrolyte film, other suitable materials and structures thereof) exhibiting ionic conductivity, and a fuel electrode 2 and an oxygen electrode 3 formed on respective surfaces of the proton conductor film layer 1.

If hydrogen, for example, is supplied to the fuel electrode 2, while oxygen is supplied to the oxygen electrode 3, cell reaction occurs to produce an electromotive force. In the case of a so-called direct methanol system, methanol may also be supplied as a hydrogen source to the fuel electrode 2.

Any suitable material exhibiting protonic conductivity may be used as the proton conductor material 1. For example, a proton conducting material may be applied to a separator for use as the proton conductor material 1. Specifically, the materials usable as the proton conductor material 1 may include a high molecular weight material capable of conducting protons (hydrogen ions), such as perfluorosulfonic acid resin, for example, Nafion(R) manufactured by Du Pont KsK.

Other proton conductor materials can include polymolybdenic acids or oxides having a large number of hydrates, such as $H_3Mo_{12}PO_{40} \cdot 29H_2O$ or $Sb_2O_5 \cdot 5.4H_2O$. If placed under wet conditions, these high molecular weight materials can exhibit high proton conductivity at or near ambient temperature.

Taking the perfluorosulfonic acid resin as an example, protons electrically dissociated from the sulfonic acid group are bound with moisture taken in large quantities into the high molecular weight matrix by a hydrogen bond to generate protonated water, that is, oxonium ions ($H_3O^+$). Such protons can smoothly migrate in the matrix in the form of these oxonium ions. Consequently, this type of the matrix material may exhibit appreciably high proton conductivity even at or near ambient temperature.

Alternatively, a proton conductor having a conduction mechanism totally different from that of the aforementioned materials may also be used. These alternative materials are composite metal oxides having a perovskite structure, such as Yb-doped $SrCeO_3$. These composite metal oxides having a perovskite structure have been found to exhibit protonic conductivity without needing moisture as the medium for movement. In these composite metal oxides, the protons are thought to be conducted by channeling themselves through oxygen ions forming the skeleton of the perovskite structure.

A proton conductor composed of a carbonaceous material that forms a matrix structure and having proton dissociating groups introduced therein, may be used for the material forming the proton conductor film 1. Proton dissociating groups are functional groups from which protons ($H^+$) may be detached by ionic dissociation. In an embodiment, the proton dissociating groups can include, for example, —OH, —$OSO_3H$, —$SO_3H$, —COOH, —OP(OH)$_2$, the like and combinations thereof. In this regard, protons are migrated through the proton dissociating groups to manifest ion conductivity.

It should be appreciated that any suitable carbonaceous material substantially composed of carbon can be utilized. It is, however, preferable that ion conductivity be relatively high and electronic conductivity be low after introducing one or more proton dissociating groups within the carbonaceous material. In an embodiment, a carbon cluster, as an aggregate of carbon atoms, or tubular carbon materials, typically including carbon nano-tubes, can be used as the carbonaceous material. Among a variety of carbon clusters, fullerene, a fullerene structure having an opening end at least at a portion thereof, or a diamond structure, is preferred.

A cluster typically means an aggregate of several to hundreds of atoms, bound or flocculated together. If these atoms are carbon atoms, such flocculation or aggregation improves proton conductivity while simultaneously holding chemical properties to provide for sufficient film strength and for ease in forming layers. A cluster mainly composed of carbon is an aggregate of several to hundreds of carbon atoms regardless of the type of the carbon—carbon bonds. Such clusters may, however, not be composed only of carbon atoms, such that other atoms may be present with the carbon atoms. Thus, an aggregate of atoms, the major portion of which is composed of carbon atoms, is termed a carbon cluster. Examples of these aggregates are shown in FIGS. 2–5, 7 in which the proton dissociating groups are omitted. It may be seen that there is wide latitude for selection of types of proton conducting materials.

Figure 2:
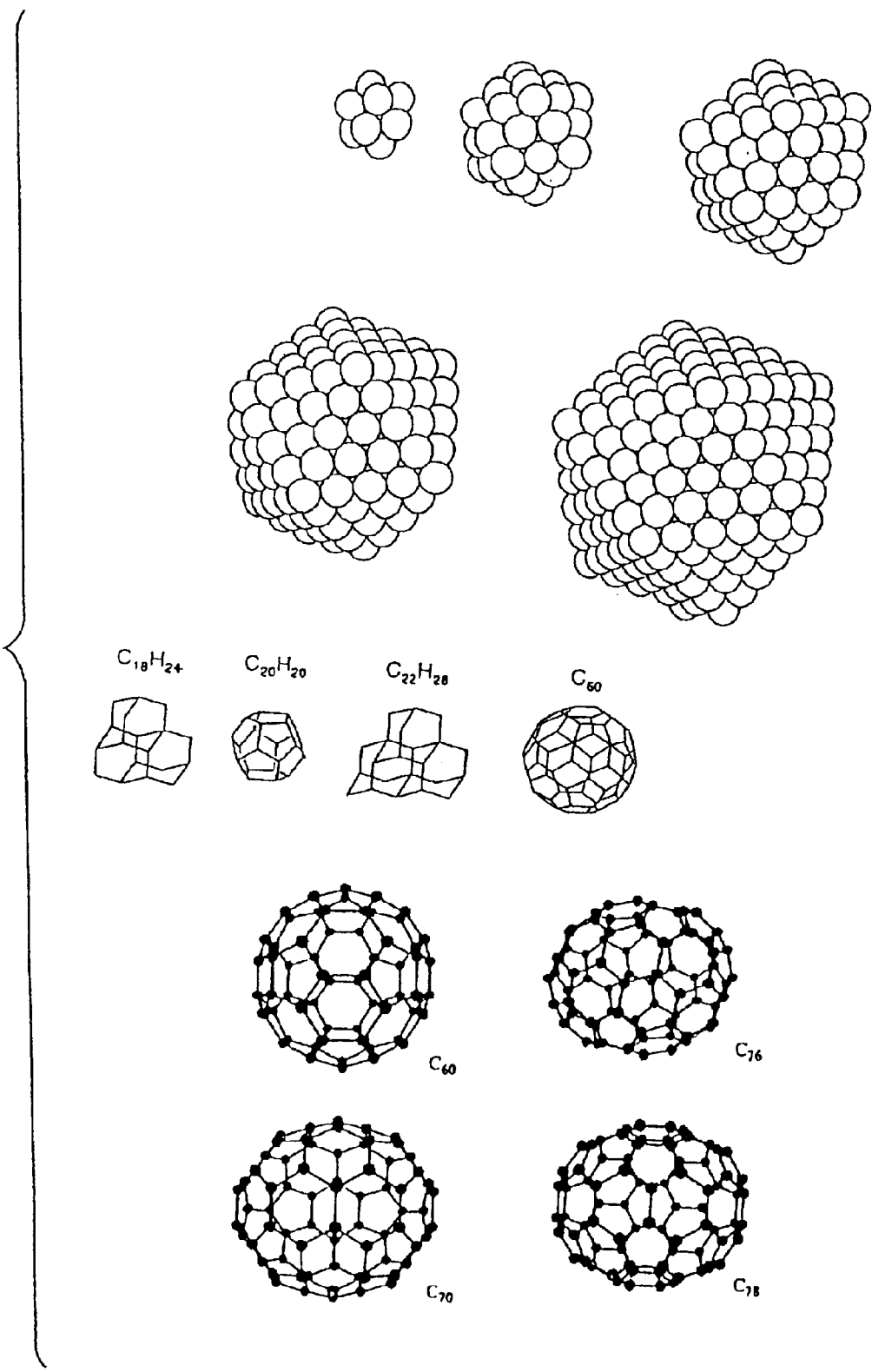
FIG. 2 schematically shows various types of carbon clusters according to an embodiment of the present invention.
Figure 3:
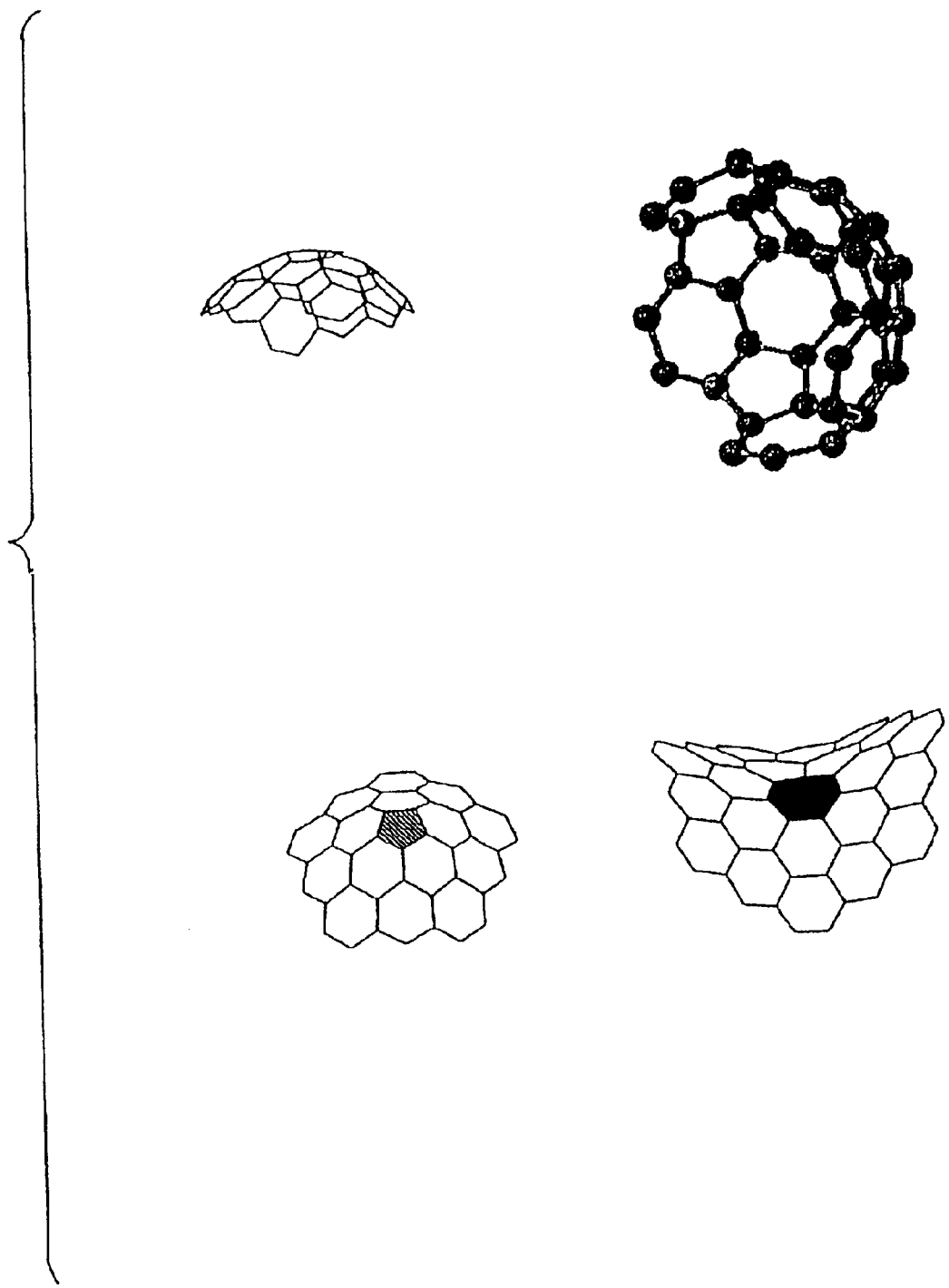
FIG. 3 schematically shows other types of the carbon clusters (e.g., partial fullerene structures) according to an embodiment of the present invention.
Figure 4:
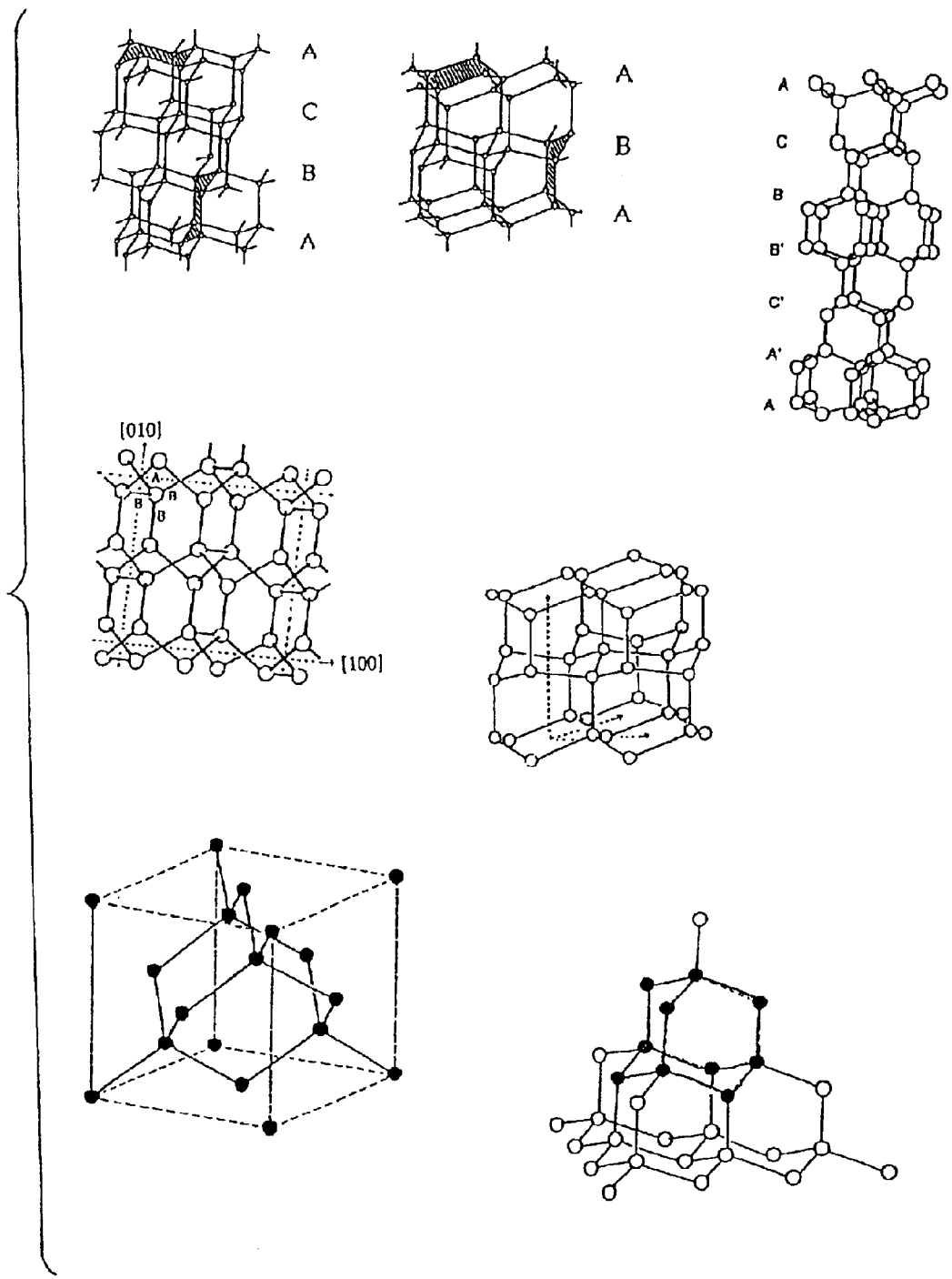
FIG. 4 schematically shows further other types of the carbon clusters (e.g., diamond structures) according to an embodiment of the present invention.

FIG. 2 shows a variety of carbon clusters, each composed of a large number of carbon atoms and each having the structure of a closed surface similar to that of a sphere, an elongated ball and the like. In FIG. 3, molecular fullerenes are also shown.

FIG. 3 shows a variety of carbon clusters, the spherical structures of which are partially interrupted. These types of the carbon clusters feature open ends in the structures. A large number of such structures may be seen as by-products in the course of the fullerene manufacturing process by arc discharge. If the major portion of the carbon atoms of the carbon cluster are bound in an $Sp^3$ bond, a diamond structure is produced, such as is shown in the structure of the various clusters in FIG. 5.

Figure 5:
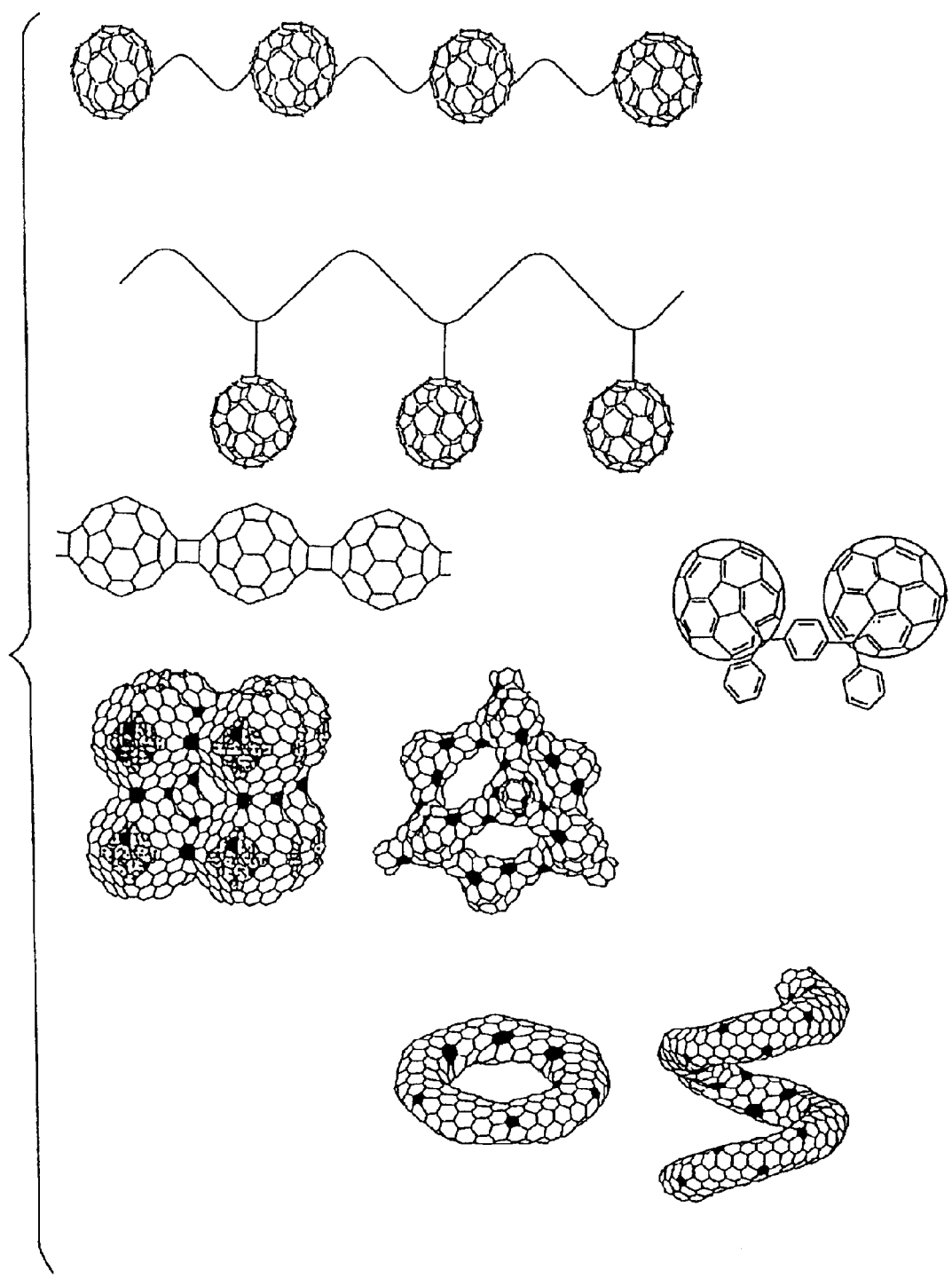
FIG. 5 schematically shows further other types of the carbon clusters (e.g., clusters bonded together) according to an embodiment of the present invention.

FIG. 5 shows several examples of different clusters that are bound together. The present invention may be applied to this type of the structure.

In the proton conductor containing, as main component, the aforementioned carbonaceous material having proton dissociating groups, protons tend to be dissociated from the groups, even in a dried state. Moreover, these protons are able to exhibit high conductivity over a wide temperature range including ambient temperature, such as a temperature range from at least about 160° C. to about −40° C. Although this proton conductor can exhibit sufficient proton conductivity even in a dry state, the presence of the moisture may be tolerated. Such moisture may be that intruded from outside the fuel cell due to environmental conditions.

In an embodiment, one or both of the fuel electrode 2 and the oxygen electrode 3 is directly formed by the arc discharge method on the proton conductor film 1 formed of the above-described materials.

Figure 6:
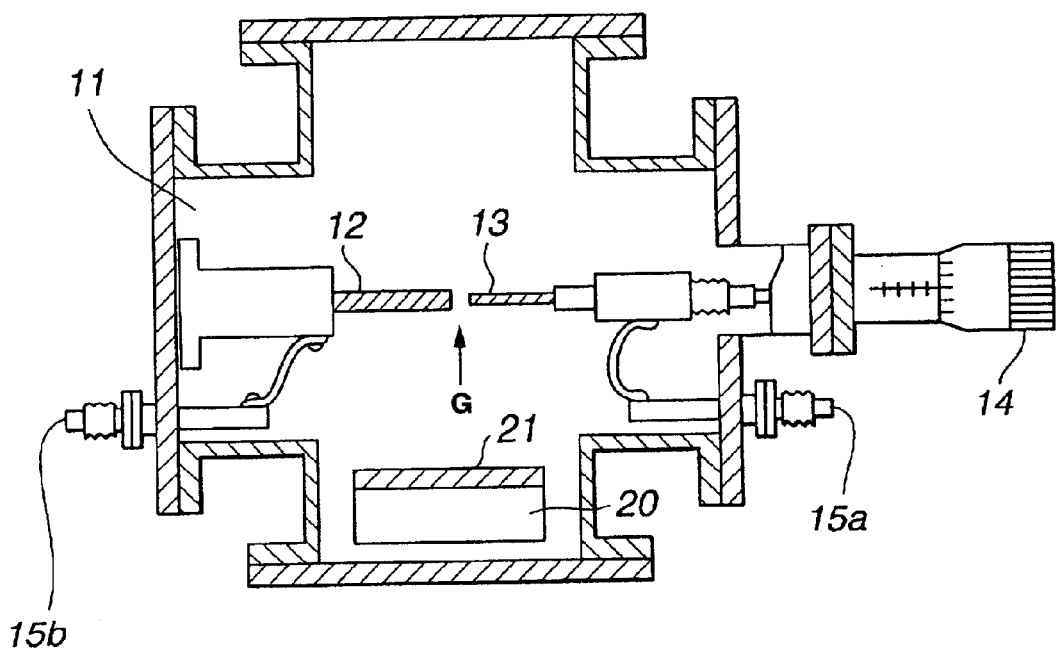
FIG. 6 schematically shows an arc discharge device used for preparing carbon nano-tubes according to an embodiment of the present invention.

FIG. 6 shows a typical arc discharge device used for the preparation of a carbonaceous material including carbon nano-tubes. In an embodiment of the present apparatus, a negative electrode 12 and a positive electrode 13, both made up of a rod of carbon, such as graphite, are arranged facing each other, with a gap G in-between, within a reaction chamber 11, which is also known as a vacuum chamber. The rear end of the positive electrode 13 is connected to a linear movement introducing mechanism 14. The electrodes 13 and 12 are connected to current introducing terminals 15a and 15b, respectively.

In an embodiment, the inside of the reaction chamber 11 can be evacuated and subsequently charged with rare gases, such as helium, and the DC current is supplied to the respective electrodes to produce arc discharged across the negative electrode 12 and the positive electrode 13. Thus, a soot-like carbonaceous material is deposited on the inner surface of the reaction chamber 11 and on the negative electrode 12.

In the soot-like carbonaceous material recovered from the reaction chamber 11, there can exist carbon nano-tubes (shown in FIG. 7A), $C_{60}$ fullerene (shown in FIG. 7B), $C_{70}$ fullerene (not shown), carbon soot (shown in FIG. 7C) other suitable materials or combinations thereof. These carbon soot molecules have a curvature which obstruct the growth to fullerene molecules or carbon nano-tubes. By way of an example, this soot-like carbonaceous material may be made up of 10 to 20% fullerene, such as $C_{60}$ or $C_{70}$ and a small percentage of carbon nano-tubes, with the balance being substantially a large quantity of the carbon soot. It should be appreciated that any suitable amount and type can be utilized.

In an embodiment, a proton conductor 20 is placed in the reaction chamber and the above-mentioned carbonaceous material is deposited thereon to form an electrode layer 21 that can operate as a fuel electrode and or as an oxygen electrode.

Arc discharge occurs under subatmospheric pressure, such as under a pressure on the order of about 0.1 to about 600 Torr in an inert gas atmosphere. There may be a slight quantity of other gases contained in the inert gas atmosphere. The current density not less than about 0.8 A/mm$^2$ suffices as the current density for inducing the arc discharge. Usually, the current density is set within a range from about 0.8 A/mm$^2$ to about 10 A/mm$^2$.

In an embodiment, the carbon nano-tubes are in the form of elongated fibers with a diameter on the order of about 1 nm and a length on the order of about 1 to about 10 $\mu$m. These fibers are entangled or otherwise formed together to form an optimum layered product even in the absence of special binders.

It is desirable in the carbonaceous material that about 10 wt % or other suitable amounts of metal exhibiting the catalytic performance of dissociating a hydrogen molecule to a hydrogen atom and further into a proton and electrons, be carried at least on its surface. In an embodiment, the metal exhibiting the catalytic performance can include, for example, platinum, platinum alloys other suitable materials and combinations thereof. If such metal is added as described above, the efficiency of the reaction may be higher than otherwise.

In order for the metal exhibiting the catalytic performance to be carried by the carbonaceous material, it is sufficient that such metal be applied to the carbonaceous material used for the negative electrode 12 and the positive electrode 13. This causes the catalytic metal to be contained in the carbonaceous material deposited.

The electrode layer 21 formed as described above need not be an independent film and hence is not required to exhibit the necessary mechanical strength to be molded and handled separately. The electrode layer 21, therefore, may be of an extremely thin thickness of about 10 $\mu$m or less. In an embodiment, the thickness ranges from about 2 to about 4 $\mu$m.

EXAMPLE 1

Using a graphite electrode (99.9%) mixed with about 10 wt % of platinum as an electrode, arc discharge was carried out in an Ar atmosphere under a condition of current density of 1A. A proton conductor film (Nafion) of about 20 $\mu$m in thickness was installed in the vacuum chamber. The distance from the carbon electrode to the conductor film was set to about 1 m. It should be appreciated that any suitable distances can be utilized, such as a distance of less than about 1 m. Arc discharge was continued for 15 minutes. After the end of the discharge, the film was taken out and its film thickness was measured using a film thickness gauge.

The analysis of the film composition revealed that the platinum content was 2 wt %, with the carbon mass weight being 20 mg. The difference from the charging ratio presumably reflects the difference in the vaporization velocity between carbon and platinum. Using this filmed electrode, hydrogen gas and dry air were circulated by the fuel electrode and by the oxygen electrode, respectively, to generate the electrical power. The power generation was carried out with the applied voltage of 0.6 V.

COMPARATIVE EXAMPLE 1

A fuel electrode and an oxygen electrode were constructed using commercially available catalyst-carrying carbon with platinum content of 2 wt %. The catalyst-carrying carbon was kneaded with a binder to form the electrodes. The carbon content was 20 mg. The evaluation of the generated power (output) was carried out under the same conditions as those of the Example 1.

|  | Output at 0.6V (mW/cm$^2$) |
|---|---|
| Ex. 1 | 70 |
| Comp. Ex. 1 | 60 |

As may be seen, the electrode formed by the arc discharge method of the may be simplified in its production process, while exhibiting output characteristics superior to those of the conventional electrode.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method of forming at least one of a fuel electrode and an oxygen electrode comprising the step of:

producing an arc discharge across a carbon-based electrode to produce a carbonaceous material which is deposited on a proton conductor material.

2. The method according to claim 1, wherein the carbon-based electrode includes a catalyst material that has a metal component such that at least a portion of the metal component is included within the carbonaceous material used to form at least one of the fuel electrode and the oxygen electrode.

3. The method according to claim 2, wherein the metal component is selected from the group consisting of platinum, platinum alloy and combinations thereof.

4. The method according to claim 1, wherein the proton conductor material comprises a carbonaceous material substantially composed of carbon defining a matrix into which one or more proton dissociating groups are introduced.

* * * * *